July 27, 1954  A. D. GILCHRIST  2,685,057
GENERATOR REGULATION EMPLOYING AUXILIARY INTERPOLE WINDING
Filed Feb. 1, 1952  2 Sheets-Sheet 1
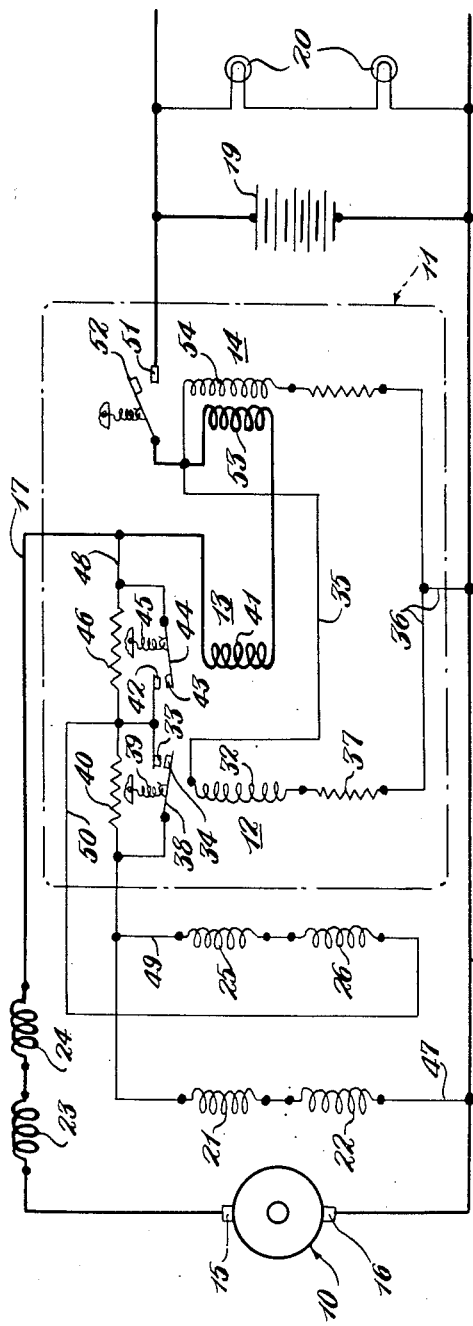
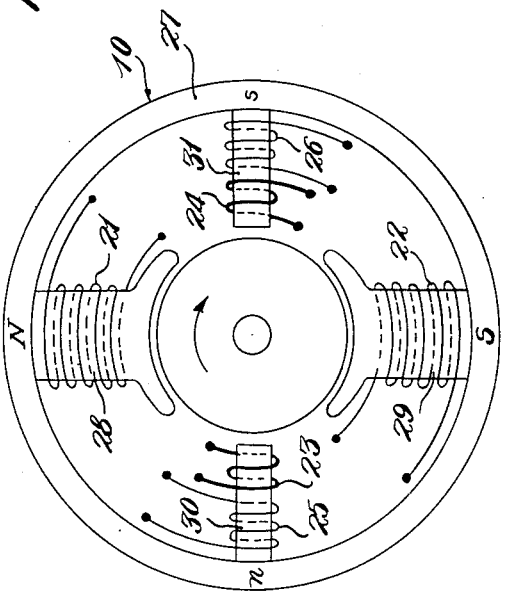
INVENTOR.
ALBERT D. GILCHRIST
BY Hudson, Boughton,
Williams, David & Hoffmann.
ATTORNEYS July 27, 1954  A. D. GILCHRIST  2,685,057
GENERATOR REGULATION EMPLOYING AUXILIARY INTERPOLE WINDING
Filed Feb. 1, 1952  2 Sheets-Sheet 2
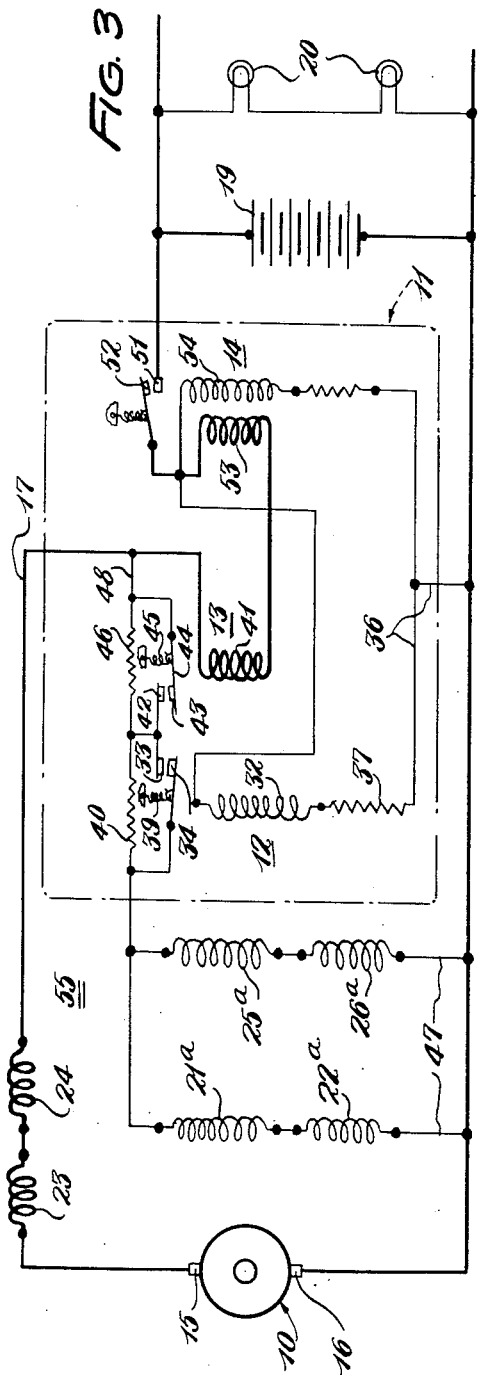
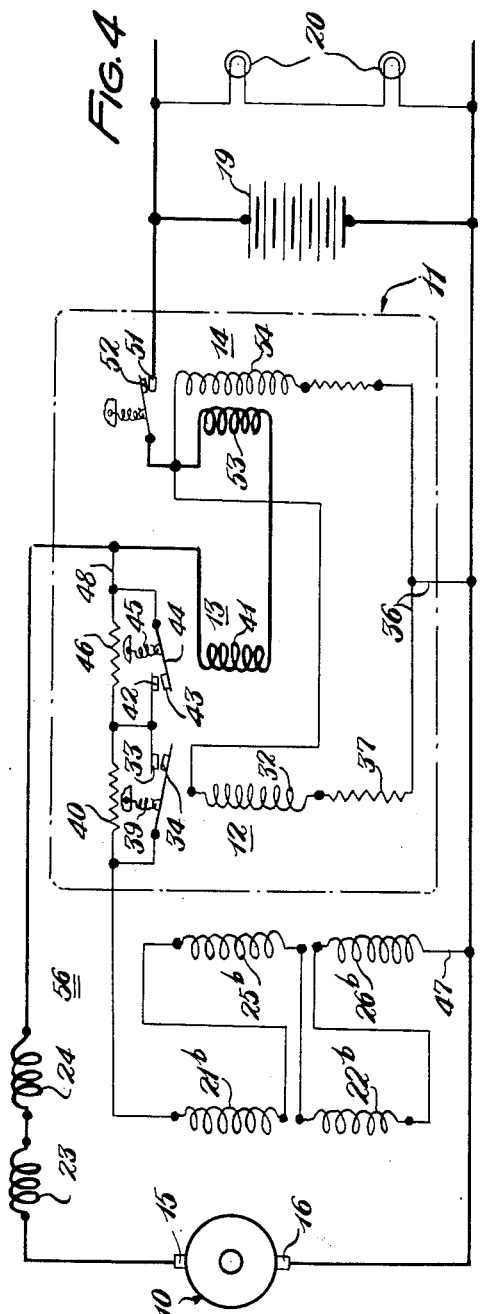
INVENTOR.
ALBERT D. GILCHRIST
BY Hudson, Coughton,
Williams, David & Hoffmann.
ATTORNEYS Patented July 27, 1954

2,685,057

UNITED STATES PATENT OFFICE 2,685,057

GENERATOR REGULATION EMPLOYING AUXILIARY INTERPOLE WINDING

Albert D. Gilchrist, Lyndhurst, Ohio, assignor to The Leece-Neville Company, Cleveland, Ohio, a corporation of Ohio Application February 1, 1952, Serial No. 269,498

4 Claims. (Cl. 322—25)

This invention relates to electrical generating systems and, more particularly, to generating systems embodying novel voltage and current regulating means. The invention is of particular utility with reference to generators operating through a wide range of speed such as the generators of vehicle electrical systems. Accordingly, the invention is disclosed herein as applied to a vehicle electrical system, but without any intention of limiting the invention thereto since it is also applicable to various other uses.

An object of the invention is to provide an improved electrical generating system embodying a generator of the interpole type and a regulator of the electromagnetic vibratory contact type, and in which the field excitation of the generator is responsive to the effect of an auxiliary interpole field winding whose energization is controlled by the regulator.

Another object is to provide an improved generating system of this character in which the energization of the auxiliary interpole field winding under the control of the regulator is a function of the generator speed, such that for increased generator speeds a greater flux will be produced by the auxiliary interpole winding to offset the change occurring in the generator reactance voltage with the increase in generator speed.

Still another object is to provide an improved generator-regulator system of the kind above referred to in which the regulator comprises a voltage regulator and/or a current regulator.

A further object is to provide an improved generator-regulator system of the character mentioned in which the vibratory switch contacts of the voltage regulator are shunted by a resistor and the excitation of the auxiliary interpole field winding is substantially in accordance with the voltage drop across the resistor.

It is also an object of this invention to provide an improved generator-regulator system of the type above indicated in which the auxiliary interpole field winding is in series with the main shunt field winding of a direct current generator embodied in the system and produces improved commutation for the generator over a wide speed range.

Yet another object is to provide such an improved generator-regulator system in which the auxiliary interpole field winding is in parallel with the main shunt field winding of the generator.

As an additional object, this invention provides an improved generator-regulator system of the kind mentioned above in which the auxiliary interpole field winding is a bucking winding magnetically opposing the normal interpole flux, such that a substantially correct resultant interpole flux strength will be produced for the minimum operating speed of the generator and, as the generator speed is increased and the regulator reduces the field current correspondingly, an interpole flux of increased strength will be available for offsetting the change which occurs in the generator reactance voltage through the increase in generator speed.

Other objects and advantages of the invention will be apparent in the following detailed description and in the accompanying sheets of drawings in which:

Fig. 1 is a wiring diagram showing a generator-regulator system embodying the present invention;

Fig. 2 is a diagrammatic view showing a generator of the interpole type to which the present invention has been applied in the generator-regulator system of Fig. 1; and Figs. 3 and 4 are wiring diagrams similar to that of Fig. 1, but showing modified forms of such a generator-regulator system.

As one practical embodiment of the present invention, Fig. 1 shows a generator-regulator system which in general comprises a direct current interpole generator 10 and a regulator and cutout unit 11 connected in circuit with the generator. The unit 11 in turn comprises a voltage regulator 12, a current regulator 13 and a reverse current cutout 14.

The generator 10 is provided with load terminals which are here shown as being the brushes 15 and 16 of the generator. A pair of load conductors 17 and 18 are connected with the load terminals 15 and 16 and represent an external load circuit to which various devices to be supplied with current are connected such as the storage battery 19 and the lamps 20. The generator 10 also comprises main shunt field windings 21 and 22 and main series field windings 23 and 24. Additionally, the generator 10 comprises control field windings 25 and 26 which are also referred to hereinafter as auxiliary interpole field windings.

The generator 10 is further illustrated in Fig. 2 as having a frame 27 of a conventional construction and which includes a pair of main north and south field pole members 28 and 29 on which the main shunt field windings 21 and 22 are located respectively. The generator frame 27 also includes a pair of north and south interpole magnet pole members 30 and 31 on which the main series field windings 23 and 24 are located respectively. The auxiliary interpole field windings, to which further reference will be made hereinafter, are also located on the interpole magnet pole members 30 and 31.

The voltage regulator 12 comprises an electromagnet which is here represented by the magnet coil 32 and a pair of cooperating vibratory switch contacts 33 and 34 which are operated in response to changes in magnetization produced by the magnet coil. The coil 32 is a voltage coil having one end thereof connected with the generator terminal 15 through the conductor 35 and the load conductor 17. The other end of the coil 32 is connected with the generator terminal 16 through a conductor 36 and the load conductor 18. The energizing circuit for the coil 32 preferably also includes a suitable ballast resistor 37.

The contact 33 of the vibratory switch contacts of the voltage regulator 12 is a stationary contact and the contact 34 is a movable contact which is carried by an armature 38 and is urged toward a position of closed engagement with the stationary contact 33 by a tension spring 39.

The voltage regulator 12 also comprises a point resistor 40 of a suitable resistance value which is contained in the field circuit of the generator 10 and is located in shunt relation to the vibratory switch contacts 33 and 34 so as to be short-circuited by these contacts when they are in their closed position.

The current regulator 13 is also a regulator of the electromagnet vibratory contact type which is sometimes also referred to as a current limiter and comprises an electromagnet which is here represented by the current coil 41 and a pair of vibratory switch contacts 42 and 43. The current coil 41 is a series coil which is here shown as being located in series relation in the conductor 17 of the external load circuit.

The contact 42 of the vibratory contacts of the current regulator 13 is a stationary contact. The contact 43 is a movable contact which is carried by an armature 44 and is urged toward a position of closed engagement with the stationary contact 42 by a tension spring 45.

The current regulator 13 also comprises a point resistor 46 which is contained in the field circuit of the generator 10 and is located in shunt relation to the vibratory switch contacts 42 and 43 such that this resistor will be short-circuited by the contacts 42 and 43 when they are in their closed position.

The portion of the field circuit of the generator 10 which contains the main shunt field windings 21 and 22 has one end thereof connected with the load conductor 18 through the conductor 47 and its other end connected with the load conductor 17 through the resistors 40 and 46 of the voltage and current regulators 12 and 13 and through the conductor 48. With the field circuit just described for the main shunt field windings 21 and 22, it will be observed whenever the vibratory contacts of one of the regulators 12 and 13 are open, the resistor of that regulator will be effective as a series resistor in such field circuit and, on the other hand, when the vibratory contacts of either regulator are closed, the resistor of that regulator will be short-circuited out of the field circuit by the closed contacts.

With respect to the voltage and current regulators 12 and 13, it will be understood, of course, that the electromagnets of these regulators include a suitable magnet frame with which the magnet coil and the movable armature are associated. The provision of such a magnet frame in a regulator of this type is conventional in the art as is shown in prior patent 2,100,905, granted November 30, 1937, and accordingly, need not be described here in any further detail.

An important feature of the present invention is the provision of the auxiliary interpole field windings 25 and 26 in the generator 10 and in such circuit relation to the regulator unit 11 as to be controlled thereby. In the generator-regulator system of Fig. 1, the auxiliary interpole windings 25 and 26 are connected with the main field circuit containing the shunt field windings 21 and 22, by means of conductors 49 and 50. The conductors 49 and 50 are connected with the main field circuit at points located on opposite sides of the resistor 40 of the voltage regulator 12 such that the energization of auxiliary interpole field windings 25 and 26 will be substantially in accordance with the voltage drop across this resistor.

Thus, when the vibratory contacts 33 and 34 of the voltage regulator 12 are closed, the resistor 40 will be short-circuited and since the voltage drop across this resistor will then be substantially a negligible value, these auxiliary interpole field windings will be substantially deenergized. On the other hand, when the contacts 33 and 34 are open and the resistor 40 is contained in the energizing circuit for the main shunt field windings 21 and 22, there will be a substantial voltage drop across this resistor, and consequently at this time, an energizing current of a substantial value will flow through the auxiliary interpole field windings 25 and 26.

When the speed of the generator 10 increases, the energization of the magnet coil 32 of the voltage regulator 12 will likewise increase and the resistor 40 will then be more effective in the energizing circuit of the main shunt field windings 21 and 22 of the generator. At the same time, the auxiliary interpole field windings 25 and 26 will be supplied with an increased amount of excitation current as a function of the voltage across the resistor 40 of the voltage regulator.

In the generator-regulator system of Fig. 1, the auxiliary interpole field windings 25 and 26 magnetically assist the main series field windings 23 and 24 of the generator 10. When the increasing speed condition of the generator causes an increased supply of excitation current to the auxiliary interpole field windings 25 and 26 through the responsive functioning of the voltage regulator 12 as just described above, the field flux produced by the auxiliary interpole windings will assist the main series field windings 23 and 24 in producing an increased flux strength in the interpole field pole members 30 and 31 of the generator. This increased flux of the interpole pole members produces the desired effect of offsetting the increase in reactance voltage of the generator which occurs with the increase in generator speed. It will accordingly be seen from the functioning of the generator-regulator system as just described above, that the auxiliary interpole field windings, as controlled by the voltage regulator 12, will result in the terminal voltage of the generator 10 being maintained at a desired substantially constant value throughout a wide speed range of operation.

It will likewise be seen that the excitation current supplied to the auxiliary interpole field windings 25 and 26 will also be controlled by the current regulator 13 as a function of the load current being delivered by the generator 10 and will limit the load current of the generator substantially to a desired maximum value. In this current control function exercised by the regulator 13, the resistor 46 controls the excitation current being supplied to the main shunt field windings 21 and 22 and to the auxiliary interpole field windings 25 and 26 whenever this resistor is rendered effective in the field circuit by the opening of the contacts 42 and 43 of the current regulator.

The cutout device 14 is a conventional device which is sometimes also referred to as a reverse current relay. This cutout device comprises a pair of stationary and movable switch contacts 51 and 52 located in the load circuit conductor 17 and a magnet having series and voltage energizing coils 53 and 54. As is understood by those skilled in this art, the cutout device 14 automatically connects and disconnects the generator 10 with respect to the external load and particularly with respect to the battery 19.

Fig. 3 of the drawings shows a generator-regulator system 55 which is generally similar to the system of Fig. 1, but in which the auxiliary interpole field windings 25$^a$ and 26$^a$ are connected in the field circuit of the generator 10 in parallel relation to the main shunt field windings 21$^a$ and 22$^a$. In this modified generator-regulator system 55, the auxiliary interpole field windings 25$^a$ and 26$^a$ are bucking coils, that is to say, they magnetically oppose the main series field windings 23 and 24 of the generator. In other respects the generator-regulator system 55 is substantially identical with the system of Fig. 1 and the same reference characters have accordingly been used to designate the other corresponding parts.

By reason of the bucking relation of the auxiliary interpole field windings 25$^a$ and 26$^a$, relative to the main series field windings 23 and 24 and their connection in the field circuit in parallel relation to the main shunt field windings 21$^a$ and 22$^a$, it will be seen that the excitation of the auxiliary interpole field windings as controlled by the regulator unit 11 will produce a condition in which the flux of the interpole pole members 30 and 31 of the generator will be of a substantially correct value for the minimum speed operating condition of the generator. As the speed of the generator increases, the regulator unit 11 will further reduce the field excitation current for the main shunt field windings 21$^a$ and 22$^a$ and for the auxiliary interpole bucking field windings 25$^a$ and 26$^a$ and a progressively stronger field flux will accordingly be produced in the magnetic circuit of the interpole field members to offset the increase which occurs in the reactance voltage of the generator with the increase in the generator speed.

Fig. 4 of the drawings shows another modified generator-regulator system 56 which is also similar to the generator-regulator system of Fig. 1, but in which the auxiliary interpole field windings 25$^b$ and 26$^b$ are contained in the field circuit of the generator 10 in a series circuit relation to the main shunt field windings 21$^b$ and 22$^b$ and in which auxiliary interpole field windings 25$^b$ and 26$^b$ are bucking coils which magnetically oppose the main series field windings 23 and 24.

Under the control of the regulator unit 11, the field current being supplied to the main shunt field windings 21$^b$ and 22$^b$ and to the auxiliary interpole field windings 25$^b$ and 26$^b$, will be reduced as the speed of the generator 10 increases. An important advantage resulting from the control thus exercised on the generator 10 is that the increased flux strength of the interpole field members 30 and 31 of the generator under these conditions will provide decidedly improved commutation for the generator over a wide speed range of operation and which improved commutation condition has not been attainable heretofore.

From the foregoing detailed description and the accompanying drawings, it will now be readily understood that this invention provides an improved generator-regulator system which is especially applicable to variable speed generators such as those employed in vehicle electrical systems and provides novel regulating means for automatically controlling the functioning of the generator and affording improved commutation therefor over a wide range of speed. Additionally, it will be seen that the present invention provides an improved generator-regulator system in which regulating means is effective on the generator through the use of auxiliary interpole field windings whose excitation is controlled by the regulating means.

Although the improved alternator-regulator system and the novel regulating means of the present invention have been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In a generating system, a generator having load terminals and also having main and interpole field windings of which said main field windings are shunt field windings and said interpole field windings are series field windings, a voltage regulator comprising a voltage magnet coil connected across said terminals and a first pair of vibratory switch contacts responsive to the energization of said voltage magnet coil, said voltage regulator also comprising a first resistor shunting said first pair of switch contacts and adapted to be short-circuited thereby, a current regulator comprising a series magnet coil connected in series with said terminals and a second pair of vibratory switch contacts responsive to the energization of said series magnet coil, said current regulator also comprising a second resistor shunting said second pair of vibratory contacts and adapted to be short-circuited thereby, control field windings associated with said interpole field windings, a field circuit connecting said main shunt field windings with said terminals through the switch contacts and resistors of said voltage and current regulators, and circuit means connecting said control field windings in said field circuit for energization substantially in accordance with the voltage drop across said first resistor.

2. A generating system as defined in claim 1, in which said control field windings magnetically assist said interpole field windings.

3. In a generating system; a generator having load terminals and also having main field poles carrying shunt field windings, and auxiliary field poles in interpole relation to said main field poles and carrying series field windings and control field windings; a voltage regulator comprising a voltage magnet coil connected across said terminals, and vibratory switch contacts responsive to the energization of said voltage coil; said voltage regulator also comprising a resistor shunting said switch contacts and adapted to be short-circuited thereby; a field circuit connecting said shunt field windings with said terminals through the switch contacts and resistor of said voltage regulator; and circuit means connecting said control field windings in said field circuit for energization substantially in accordance with the voltage drop across said resistor.

4. A generating system as defined in claim 3 in which said control field windings magnetically assist said series field windings.

References Cited in the file of this patent

UNITED STATES PATENTS

| Number | Name | Date |
|---|---|---|
| 929,758 | Field | Aug. 3, 1909 |
| 1,313,272 | Parker | Aug. 19, 1919 |
| 1,325,597 | Turbayne | Dec. 23, 1919 |
| 1,701,362 | Haddrell | Feb. 5, 1929 |
| 1,910,473 | McNeil | May 23, 1933 |
| 2,046,699 | Rady et al. | July 7, 1936 |
| 2,100,905 | Leece | Nov. 30, 1937 |
| 2,133,976 | Creveling | Oct. 25, 1938 |
| 2,233,772 | Creveling | Mar. 4, 1941 |
| 2,469,092 | Webb | May 3, 1949 |

FOREIGN PATENTS

| Number | Country | Date |
|---|---|---|
| 17,922 | Great Britain | Aug. 6, 1913 |
| 113,096 | Great Britain | Dec. 31, 1919 |
| 790,933 | France | Sept. 16, 1935 |